United States Patent
Lin et al.

(10) Patent No.: US 9,608,531 B2
(45) Date of Patent: Mar. 28, 2017

(54) TIMING CONTROL METHOD AND APPARATUS FOR SYNCHRONOUS RECTIFIER USING ESTIMATED DURATION SIGNAL

(71) Applicant: Leadtrend Technology Corporation, Hsinchu (TW)

(72) Inventors: Chung-Wei Lin, Hsinchu (TW); Yang-Sheng Lin, Hsinchu (TW); Wen-Chung Yeh, Hsinchu (TW)

(73) Assignee: LEADTREND TECHNOLOGY CORPORATION, Hsinchu (TW)

( * ) Notice: Subject to any disclaimer, the term of this patent is extended or adjusted under 35 U.S.C. 154(b) by 51 days.

(21) Appl. No.: 14/604,843

(22) Filed: Jan. 26, 2015

(65) Prior Publication Data

US 2015/0214850 A1     Jul. 30, 2015

(30) Foreign Application Priority Data

Jan. 27, 2014    (TW) .............................. 103102843 A

(51) Int. Cl.
*H02M 3/335*     (2006.01)
*H02M 1/08*      (2006.01)

(52) U.S. Cl.
CPC ......... *H02M 3/33592* (2013.01); *H02M 1/08* (2013.01); *H02M 3/335* (2013.01); *H02M 3/33507* (2013.01); *Y02B 70/1475* (2013.01)

(58) Field of Classification Search
CPC ..................................................... H02M 3/335
USPC ................................ 363/21.14, 21.16, 21.18
See application file for complete search history.

(56) References Cited

U.S. PATENT DOCUMENTS

| | | | | |
|---|---|---|---|---|
| 2008/0002441 | A1* | 1/2008 | Allinder | H02M 3/33592 363/21.14 |
| 2009/0027926 | A1* | 1/2009 | Yang et al. | H02M 3/33592 363/21.14 |
| 2012/0020123 | A1* | 1/2012 | Hsu | H02M 1/32 363/21.14 |
| 2012/0033460 | A1* | 2/2012 | Yeh et al. | H02M 1/083 363/21.18 |

* cited by examiner

*Primary Examiner* — Jue Zhang
*Assistant Examiner* — Trinh Dang
(74) *Attorney, Agent, or Firm* — McClure, Qualey & Rodack, LLP

(57) ABSTRACT

A timing controller provides adaptive timings to control a synchronous rectifier with a body diode. The timing controller has a ramp generator providing a ramp signal at a first capacitor. The ramp signal corresponds to a discharge time when the body diode is forward biased. A second capacitor records an estimated duration signal. An update circuit is connected between the first and second capacitors, for shorting the first and second capacitor to update the estimated duration signal by charge sharing. A comparator with two inputs coupled to the ramp signal and the estimated duration signal respectively compares the ramp signal and the estimated duration signal to control the synchronous rectifier.

15 Claims, 4 Drawing Sheets

TIMING CONTROL METHOD AND APPARATUS FOR SYNCHRONOUS
RECTIFIER USING ESTIMATED DURATION
SIGNAL

CROSS-REFERENCE TO RELATED APPLICATION

This application claims priority to and the benefit of Taiwan Application Series Number 103102843 filed on Jan. 27, 2014, which is incorporated by reference in its entirety.

BACKGROUND

The present disclosure relates generally to synchronous rectification, and more specifically to timing control of a synchronous rectifier used in a power supply.

Power suppliers are demanded for providing accurate output voltages, currents, or powers. Furthermore, to be eco-friendly to this world, power conversion efficiency, the ratio of output power to input power, has become one of the key issues that almost power supplies are required to improve. Several countries have further proposed or enforced regulations regarding power conversion efficiency requirements for certain applications.

FIG. 1 demonstrates a switching mode power supply 10 with a flyback topology. A pulse width modulator 14 turns ON and OFF a power switch 20 alternatively. When the power switch 20 is ON, the input voltage power $V_{IN}$ and input ground 26 together energize the primary winding of the transformer 18. When it is OFF, the energy stored in the transformer 18 is released via the secondary winding of the transformer 18 and rectified by a rectifying diode 12, to build output voltage power $V_{OUT}$ and output ground 28 and to power output capacitor 17 and load 16. With appropriate feedback control, the duty cycle of the power switch 20 could be modulated by pulse width modulator 14 so output voltage power $V_{OUT}$ meets its specifications required.

Transformer 18 provides secondary current $I_{SEC}$ from its secondary winding to power output capacitor 17 and load 16, and this secondary current $I_{SEC}$ has go through rectifying diode 12, which has a constant forward voltage (about 1V) and consumes power uselessly and inevitably. To save the power consumed by rectifying diode 12 and improve the power conversion efficiency, rectifying diode 12 has been replaced in some applications by a power switch with a very-low ON resistance, as demonstrated in FIG. 2, and this power switch is called synchronous rectifier 24 in the art. The timing to turn ON or OFF synchronous rectifier 24 must be well controlled to simulate the behavior of rectifying diode 12 in FIG. 1. For example, synchronous rectifier 18 should be turned OFF when power switch 20 is ON and the transformer 18 is being energized, and should be ON when the transformer 18 is releasing energy.

Synchronous rectifier 24 need be turned OFF timely. If synchronous rectifier 24 is turned OFF too early before transformer 18 completes discharging, the whole power supply system might not gain improvement in conversion efficiency. If synchronous rectifier 24 is turned OFF much later after the completion of discharging, output voltage power $V_{OUT}$ might reversely energize transformer 18. Much worse, if power switch 20 is switched to be ON when synchronous rectifier 24 has not been turned OFF, transformer 18 might explode, causing risk of fire.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Even though the following uses a switching mode power supply with a flyback topology as an example of the embodiments of the invention, this invention is not limited to. For instance, the invention might be embodied by a buck converter, a booster, or a buck-booster.

Figure 1:
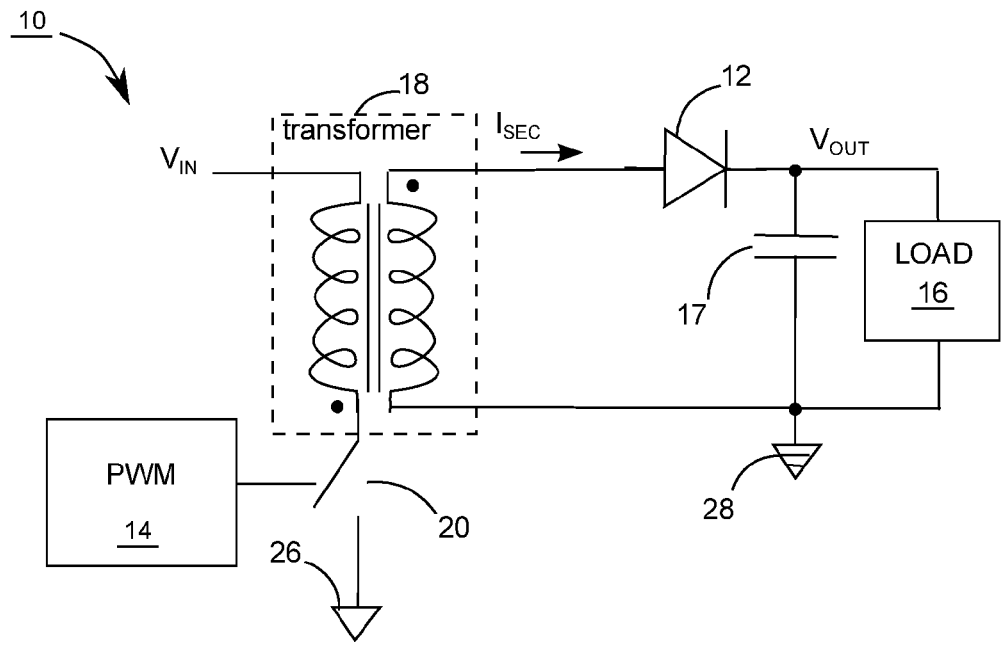
FIG. 1 demonstrates a switching mode power supply with a flyback topology.
Figure 2:
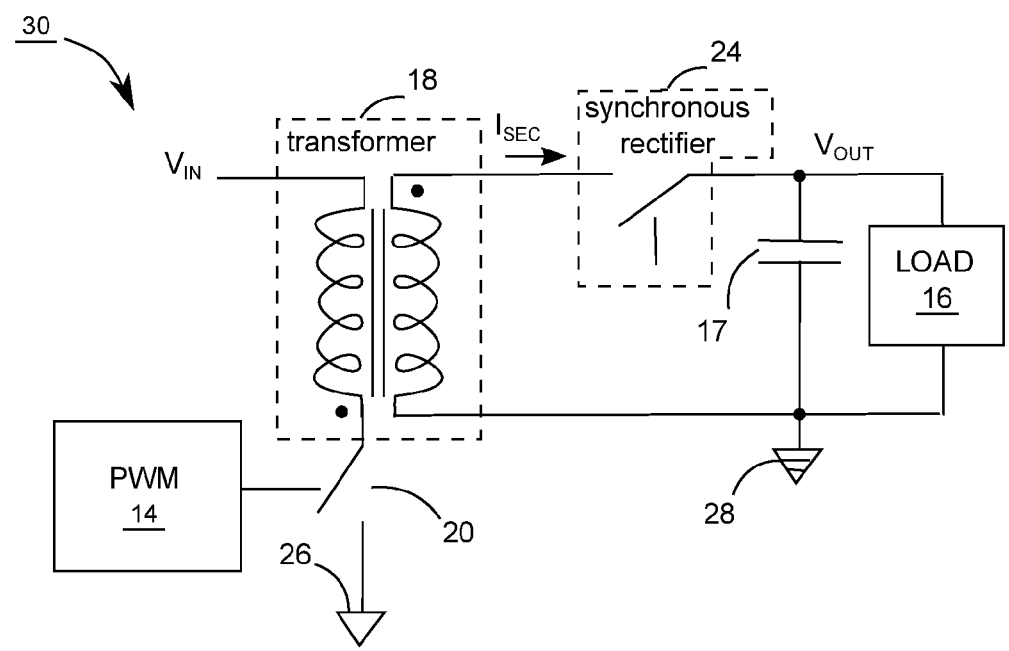
FIG. 2 demonstrates another switching mode power supply with a synchronous rectifier.
Figure 3:
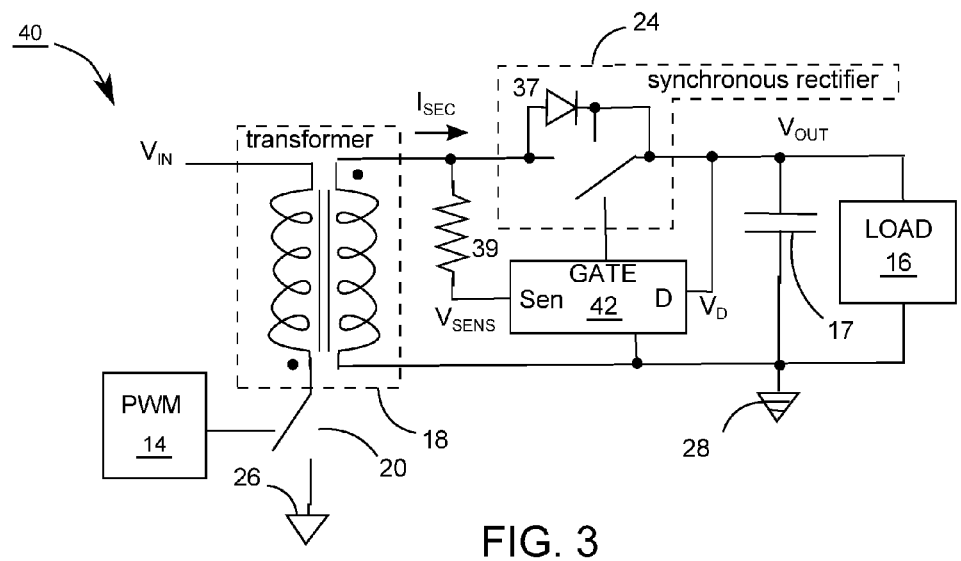
FIG. 3 demonstrates a switching mode power supply according to embodiments of the invention.

FIG. 3, which is not intended to limit the invention, demonstrates a flyback converter, a switching mode power supply 40, having a synchronous rectification (SR) controller 42 for controlling synchronous rectifier 24, a kind of power switch. Exemplified by FIG. 3, synchronous rectifier 24 is a PMOS transistor with a body diode 37 parasitically residing between its source and substrate body. Terminal D of SR controller 42 is connected to the drain of synchronous rectifier 24, while sensing terminal Sen is coupled to the source of synchronous rectifier 24 via resistor 39. Synchronous rectifier 24 has its drain shorted to its substrate body. SR controller 42 has a ground terminal connected to output ground 28.

Figure 4:
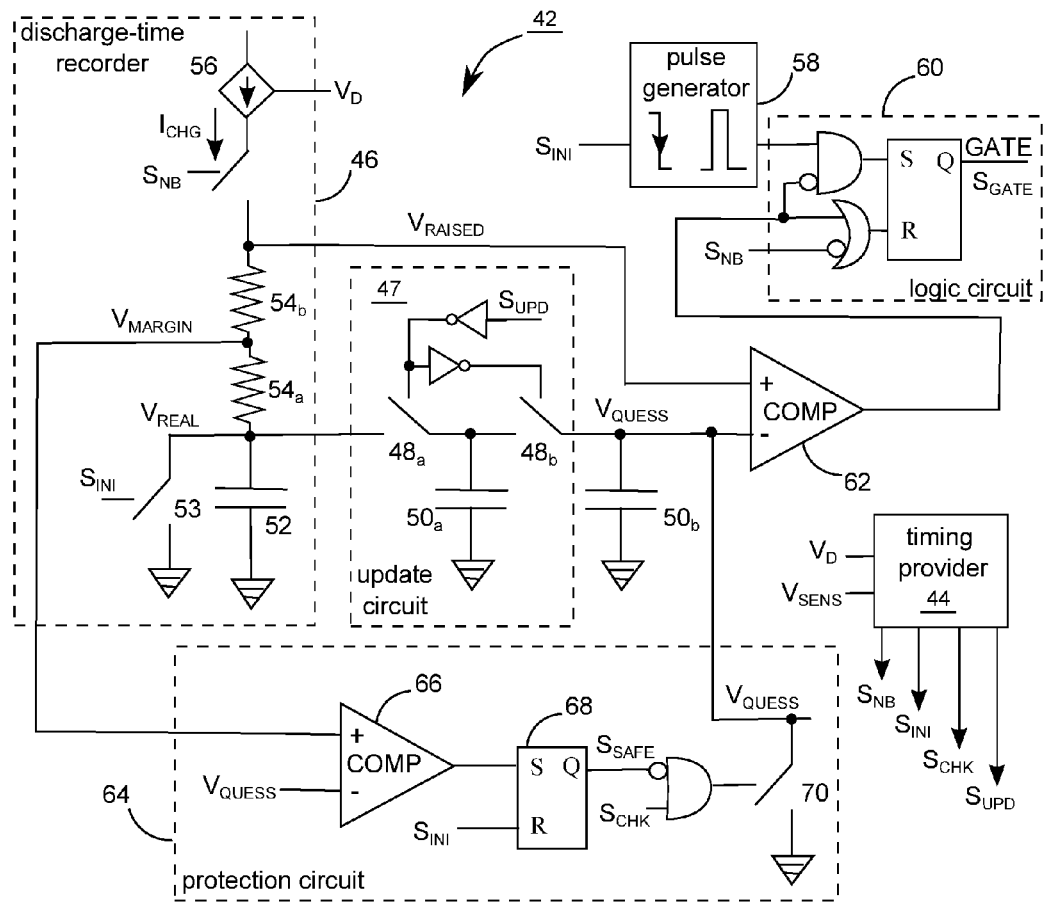
FIG. 4 demonstrates the SR controller of FIG. 3.

FIG. 4 demonstrates SR controller 42 of FIG. 3, and includes a timing provider 44, a discharge-time recorder 46, update circuit 47, record capacitor $50_b$, and protection circuit 64.

Timing provider 44 generates and provides bias-condition signal $S_{NB}$, initiation signal $S_{INI}$, check signal $S_{CHK}$, and update signal $S_{UPD}$, in response to voltage $V_D$ at terminal D and voltage $V_{SENS}$ at sensing terminal Sen, where voltage $V_D$ also means the voltage of output voltage power $V_{OUT}$. Discharge-time recorder 46, as a recorder, provides present duration signal $V_{REAL}$, which represents or corresponds to the duration when body diode 37 is forward biased or when secondary current $I_{SEC}$ is positive to charge output capacitor 17. Record capacitor $50_b$, as another recorder, provides an estimated duration signal $V_{QUESS}$. Update circuit 47 uses the peak of present duration signal $V_{REAL}$ to update estimated duration signal $V_{QUESS}$ at a predetermined moment after discharge time $T_{DIS}$, which will be detailed later, such that estimated duration signal $V_{QUESS}$ becomes closer to the peak of present duration signal $V_{REAL}$. Comparator 62 and logic circuit 60 as a whole is deemed to be a switch controller, for generating a gate signal $S_{GATE}$ at a gate terminal GATE to control synchronous rectifier 24. Protection circuit 64 also checks the difference between voltage $V_{MARGIN}$ and estimated duration signal $V_{QUESS}$ to generate safeness signal $S_{SAFE}$ accordingly.

Estimated duration signal $V_{QUESS}$ represents an estimated result to a discharge time $T_{DIS}$ in the current switching cycle. In one embodiment, estimated duration signal $V_{QUESS}$ is used to determine the moment when synchronous rectifier 24 is switched to be OFF, and estimated duration signal $V_{QUESS}$ no matter what its initial value is, quickly approaches discharge time $T_{DIS}$ switching cycle by switching cycle.

Figure 5:
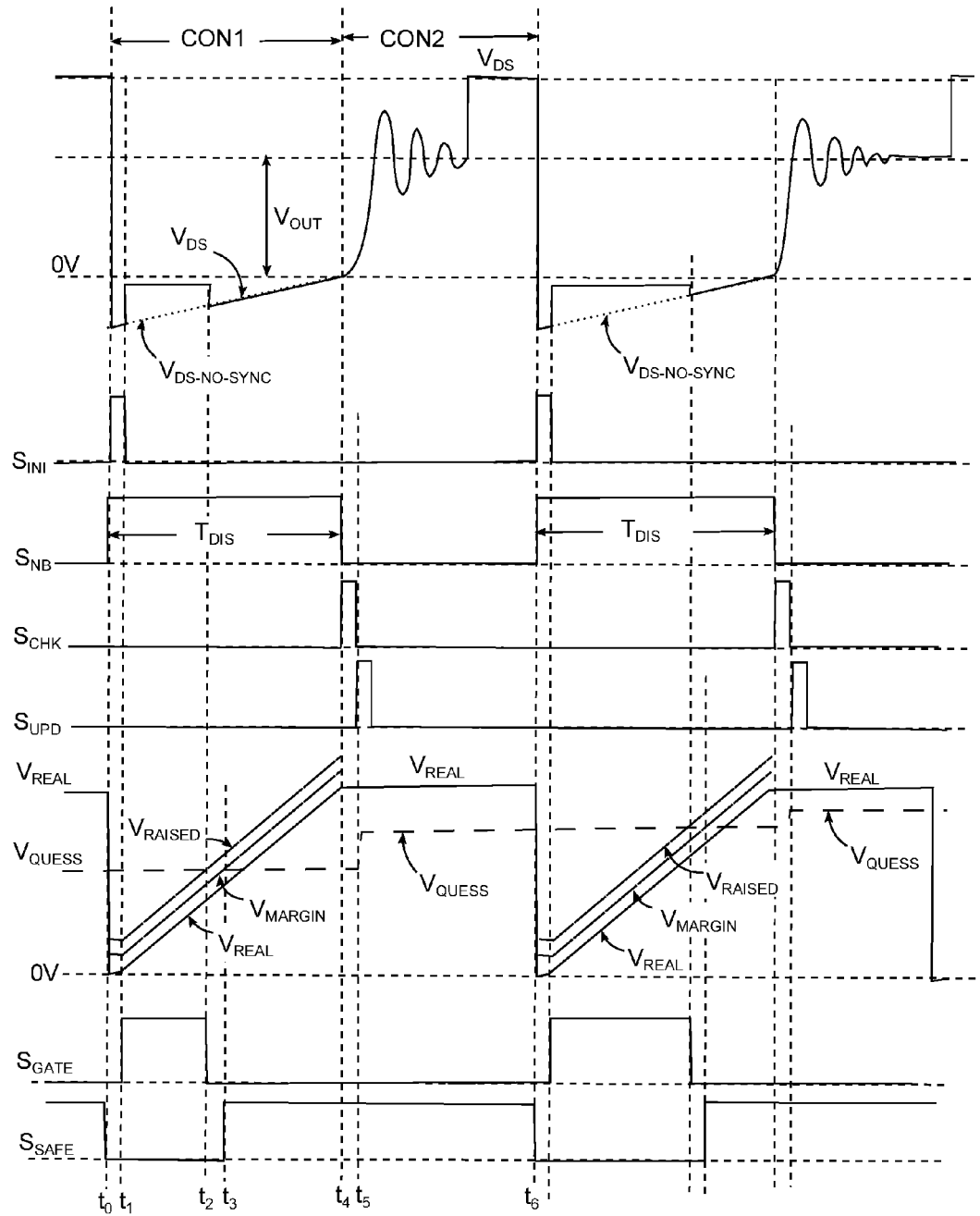
FIG. 5 shows a timing diagram for signals in FIG. 4, to detail possible operations of the circuit in FIG. 4.

FIG. 5 shows a timing diagram for signals in FIG. 4, to detail possible operations of the circuit in FIG. 4 in reference to switching mode power supply 40 in FIG. 3.

The upmost waveform in FIG. 5 is of drain-to-source voltage $V_{DS}$ of synchronous rectifier 24, and could be derivable from the difference between voltage $V_D$ (at terminal D) and voltage $V_{SENS}$ at sensing terminal Sen. At moment $t_0$, as power switch 20 in FIG. 3 is just turned OFF, drain-to-source voltage $V_{DS}$ goes to become negative, and timing provider 44 accordingly generates a short pulse to be initiation signal $S_{INI}$, meaning the beginning of a discharge time $T_{DIS}$. Bias-condition signal $S_{NB}$ is "1" in logic if drain-to-source voltage $V_{DS}$ is negative or body diode 37 is forward biased. Otherwise bias-condition signal $S_{NB}$ is "0". As denoted in FIG. 5, synchronous rectifier 24 can operate in condition CON1 when drain-to-source voltage $V_{DS}$ is negative, or condition CON2 when drain-to-source voltage $V_{DS}$ is positive. One duration when bias-condition signal $S_{NB}$ is kept as "1" is a discharge time $T_{DIS}$ as being denoted in FIG. 5. At moment $t_4$ in FIG. 5, drain-to-source voltage $V_{DS}$ ramps to become positive, so bias-condition signal $S_{NB}$ turns to be "0", concluding discharge time $T_{DIS}$. At moment $t_4$, timing provider 44 also generates a short pulse to be check signal $S_{CHK}$, soon after which, at moment $t_5$ in FIG. 5, another short pulse is generated to be update signal $S_{UPD}$.

At moment $t_0$, the pulse of initiation signal $S_{INI}$ turns ON switch 53, resetting present duration signal $V_{REAL}$ to be 0V, a default value. Present duration signal $V_{REAL}$ is kept as 0V until moment $t_1$, and the duration between moments $t_0$ and $t_1$, the pulse width of initiation signal $S_{INI}$, is called initial time.

At moment $t_1$, charge current $I_{CHG}$, generated by voltage-to-current converter 56 according to voltage $V_D$ at terminal D, starts charging capacitors 52 and $50_a$ via resistors $54_a$ and $54_b$, to provide present duration signal $V_{REAL}$, which ramps up over time until the end of discharge time $T_{DIS}$. Accordingly, present duration signal $V_{REAL}$ is also a ramp signal, and discharge-time recorder 46 is also a ramp generator. After moment $t_4$ when discharge time $T_{DIS}$ concludes, present duration signal $V_{REAL}$ is held unchanged, remaining at its peak, whose voltage value represents the duration when body diode 37 is forward biased or, in other words, discharge time $T_{DIS}$.

As denoted in FIG. 4, voltages $V_{RAISED}$ and $V_{MARGIN}$ are the voltages at two opposite ends of resistor $54_b$. When bias-condition signal $S_{NB}$ is "1" in logic, voltage $V_{RAISED}$ is at the joint node between resistor $54_b$ and voltage-to-current converter 56, and voltage $V_{MARGIN}$ at the joint node between resistors $54_a$ and $54_b$. Charge current $I_{CHG}$ from voltage-to-current converter 56 flows first to the node with voltage $V_{RAISED}$ and second to the node with voltage $V_{MARGIN}$, so voltage $V_{RAISED}$ is higher than voltage $V_{MARGIN}$, which exceeds present duration signal $V_{REAL}$, as shown in FIG. 5. Resistors $54_a$ and $54_b$ could be deemed as two offset generators, each providing an offset voltage. Shown in FIG. 5, during discharge time $T_{DIS}$, duration signal $V_{REAL}$ is added with a constant offset voltage to generate voltage $V_{MARGIN}$, which is added further with another constant offset voltage to generate voltage $V_{RAISED}$.

At moment $t_1$ when the short pulse of initiation signal $S_{INI}$ ends, the falling edge of initiation signal $S_{INI}$, via pulse generator 58, sets the SR register in logic circuit 60, making gate signal $S_{GATE}$ at the output of the SR register "1" in logic. In this embodiment, since synchronous rectifier 24 is a PMOS transistor, gate signal $S_{GATE}$ is at a relatively-low voltage level to turn ON synchronous rectifier 24 if its logic value is "1". In the opposite, it is at a relatively-high voltage level to turn OFF synchronous rectifier 24 if its logic value is "0". Due to the very low ON-resistance of synchronous rectifier 24, the turning ON of synchronous rectifier 24 suddenly reduces drain-to-source voltage $V_{DS}$, as shown in FIG. 5. FIG. 5 also illustrates reference signal $V_{DS\text{-}NO\text{-}SYNC}$ as a comparison to drain-to-source voltage $V_{DS}$. Reference signal $V_{DS\text{-}NO\text{-}SYNC}$ in FIG. 5 has a waveform with dotted curves and illustrates what drain-to-source voltage $V_{DS}$ would like if synchronous rectifier 24 were replaced by a rectifying diode.

At moment $t_2$ when voltage $V_{RAISED}$ exceeds estimated duration signal $V_{QUESS}$, the output of comparator 62 resets the SR register in logic circuit 60, making gate signal $S_{GATE}$ "0" and turning OFF synchronous rectifier 24. Accordingly, in the meantime, drain-to-source voltage $V_{DS}$ and reference signal $V_{DS\text{-}NO\text{-}SYNC}$ merge, as shown in FIG. 5. Simply put, at the moment when the difference from estimated duration signal $V_{QUESS}$ to present duration signal $V_{REAL}$ becomes less than the offset voltage inclusively provided by both resistors $54_a$ and $54_b$, synchronous rectifier 24 is switched to be OFF.

At moment $t_0$, initiation signal $S_{INI}$ also resets SR register 68, making safeness signal $S_{SAFE}$ "0" in logic, which means unsafe and will be detailed later. Only if voltage $V_{MARGIN}$ has exceeded estimated duration signal $V_{QUESS}$, then comparator 66 sets SR register 68 to make safeness signal $S_{SAFE}$ "1", as demonstrated by what happens at moment $t_3$ in FIG. 5. In other words, during discharge time $T_{DIS}$, in case that the summation of present duration signal $V_{REAL}$ and the offset voltage provided from resistor $54_a$ never exceeds estimated duration signal $V_{QUESS}$, safeness signal $S_{SAFE}$ will remain to be "0" all the time.

The pulse of check signal $S_{CHK}$ starting at moment $t_4$ in FIG. 5 passes the inverse of safeness signal $S_{SAFE}$ to a control node of switch 70. Turning ON of switch 70 resets estimated duration signal $V_{QUESS}$ to be at a constant voltage level, which for example is a ground in FIG. 4. In FIG. 5, as safeness signal $S_{SAFE}$ has been set to be "1" before moment $t_4$, it implies that estimated duration signal $V_{QUESS}$ for the present discharge time $T_{DIS}$ can safely cause synchronous rectifier 24 to be turned OFF timely before body diode 37 becomes positively biased. So estimated duration signal $V_{QUESS}$ seems appropriate and safe in the meantime. Therefore, switch 70 is always turned OFF based on the signal waveforms of FIG. 5, and protection circuit 64 has no influence to estimated duration signal $V_{QUESS}$, which is held unchanged at moment $t_4$ in FIG. 5.

At moment $t_5$, the pulse of update signal $S_{UPD}$ first turns OFF switch $48_a$ and then turns ON switch $48_b$. When switch $48_a$ is just turned OFF, capacitor $50_a$ records present duration signal $V_{REAL}$, which in the meantime is at its peak. At the moment when switch $48_b$ is turned ON, charge sharing between two capacitors $50_a$ and $50_b$ occurs as they are sharing a common node, so estimated duration signal $V_{QUESS}$ is altered or updated. For example, if capacitors $50_a$ and $50_b$ have about the same capacitance. The voltage level of the estimated duration signal $V_{QUESS}$ after updated will be just at the middle between the voltage levels of present duration signal $V_{REAL}$ and the estimated duration signal $V_{QUESS}$ before updated, as demonstrated in FIG. 5. Based on the theory of charge sharing, $V_{QUESS}$ after updated must be equal to $w*V_{QUESS}+(1-w)*V_{REAL}$, where w is a weighting factor between 0 and 1 and depends on the capacitances of capacitors $50_a$ and $50_b$.

At moment $t_6$ in FIG. 5, power switch 20 (in FIG. 3) is switched to be OFF again, so the pulse of initiation signal $S_{INI}$ reappears and bias-condition signal $S_{NB}$ turns to be "1". The duration from moment $t_0$ and $t_6$ could be deemed as a switching cycle. During the switching cycle following moment $t_6$, estimated duration signal $V_{QUESS}$ is updated, and becomes further closer to the peak value of present duration signal $V_{REAL}$, as shown in FIG. 5.

The pulse width of gate signal $S_{GATE}$ shown in FIG. 5 for the switching cycle from moment $t_0$ to moment $t_6$ safely resides within discharge time $T_{DIS}$, even it is much narrower than the width of discharge time $T_{DIS}$ in the same switching cycle. The pulse width of gate signal $S_{GATE}$ after moment $t_6$ significantly increases, so as to increase the conversion efficiency of switching mode power supply 40 in FIG. 3. This increment in the pulse width of gate signal $S_{GATE}$ stops when signal $V_{QUESS}$ becomes equal to the peak of present duration signal $V_{REAL}$.

Based on the aforementioned teaching regarding to FIGS. 3, 4 and 5, estimated duration signal $V_{QUESS}$ approaches, switching cycle by switching cycle, the peak value of present duration signal $V_{REAL}$, and this result is achieved by charge sharing between two capacitors. Charge sharing could make estimated duration signal $V_{QUESS}$ approach the peak value of present duration signal $V_{REAL}$ at a pretty high rate. The offset voltages provided by resistors $54_a$ and $54_b$ help with generating gate signal $S_{GATE}$ to turn OFF synchronous rectifier 24 timely before body diode 37 becomes positively biased, so the power conversion efficiency could be improved. The use of resistors $54_a$ and $54_b$ could result in a circuit more immune to variation of manufacture processes, circuit operation temperature, and so on.

Voltage-to-current converter 56, acting as a current source, provides charge current $I_{CHG}$ in response to voltage $V_D$ at terminal D, which is also the voltage at an end of body diode 37 in FIG. 3. In one embodiment, the higher the voltage $V_D$ the more the charge current $I_{CHG}$. In case that load 16 in FIG. 3 was heavy and suddenly becomes light or no load, the voltage level of output voltage power $V_{OUT}$, which is also the voltage $V_D$, rises first, and discharge time $T_{DIS}$, as a result, becomes shorter. SR controller 42 in FIG. 4 is beneficial in turning OFF synchronous rectifier 24 earlier during the present switching cycle. In FIG. 4, the increment of voltage $V_D$ increases charge current $I_{CHG}$, so present duration signal $V_{REAL}$ ramps up quicker during discharge time $T_{DIS}$ to turn OFF synchronous rectifier 24 earlier than it did before. Earlier turning OFF synchronous rectifier 24 could avoid lots of troubles caused by a shorten discharge time $T_{DIS}$.

Figure 6:
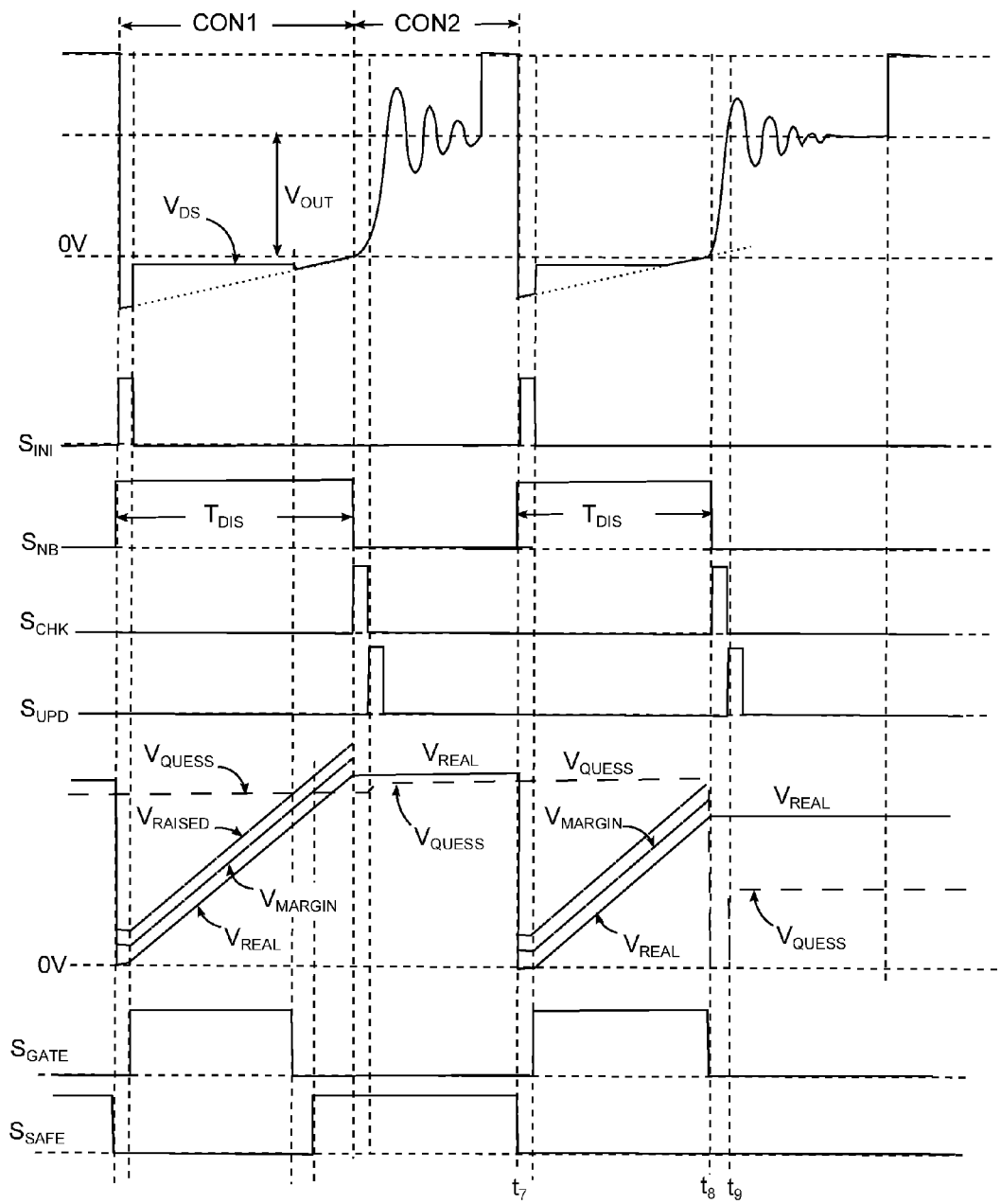
FIG. 6 shows a timing diagram for signals in FIG. 4, to demonstrate protection for the condition when discharge time $T_{DIS}$ is suddenly and largely shortened.

FIG. 6 shows a timing diagram for signals in FIG. 4, to demonstrate protection for the condition when discharge time $T_{DIS}$ is suddenly and largely shortened.

For some reasons, such as that the duration when power switch 20 (of FIG. 3) is ON becomes suddenly short, the discharge time $T_{DIS}$ becomes much shorter after moment $t_7$ of FIG. 6 than it was before moment $t_7$. In FIG. 6, voltage $V_{MARGIN}$ has not exceeded estimated duration signal $V_{QUESS}$ before moment $t_8$ when discharge time $T_{DIS}$ concludes. So safeness signal $S_{SAFE}$ is still "0" after moment $t_8$, meaning that the moment when synchronous rectifier 24 is turned OFF in the present switching cycle is very unsafely close to the moment when discharge time $T_{DIS}$ ends. This doubt in safeness could and should be solved in subsequent switching cycles. At moment $t_8$ of FIG. 6, the pulse of check signal $S_{CHK}$ has switch 70 turned ON, resetting estimated duration signal $V_{QUESS}$ to be at a ground voltage, a constant. At moment $t_9$ of FIG. 6, charge sharing performs, and estimated duration signal $V_{QUESS}$ is updated to be more than 0V but less than present duration signal $V_{REAL}$. Estimated duration signal $V_{QUESS}$ after moment $t_9$ is much lower than it was before moment $t_8$, so it is perceivable that synchronous rectifier 24 will be turned OFF earlier and more safely in the next switching cycle following moment $t_9$. The problems or risks caused by a short discharge time $T_{DIS}$ could be therefore avoided.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A timing control method, suitable for a switching mode power supply with a synchronous rectifier, comprising:
   generating a present duration signal at a first capacitor, wherein the present duration signal corresponds to a discharge time when the synchronous rectifier is operated in a first condition;
   providing an estimated duration signal at a second capacitor;
   controlling the synchronous rectifier based on the estimated duration signal;
   during a period of time when the synchronous rectifier is operated in a second condition different from the first condition, updating the estimated duration signal by charge sharing between the first and second capacitors;
   providing a current source to generate a charge current charging the first capacitor;
   connecting a resistor between the current source and the first capacitor; and
   comparing a voltage at a joint node between the resistor and the current source with the estimated duration signal to control the synchronous rectifier.

2. The timing control method of claim 1, wherein the discharge time is determined by detecting the duration when the synchronous rectifier is biased to charge a load.

3. The timing control method of claim 1, further comprising:
   resetting the present duration signal to have a default value during an initial time at the beginning of the discharge time.

4. The timing control method of claim 1, comprising:
   generating the charge current based on a terminal voltage of the synchronous rectifier.

5. A timing control method, suitable for a switching mode power supply with a synchronous rectifier, comprising:
   generating a present duration signal at a first capacitor, wherein the present duration signal corresponds to a discharge time when the synchronous rectifier is operated in a first condition;
   providing an estimated duration signal at a second capacitor;
   controlling the synchronous rectifier based on the estimated duration signal;

during a period of time when the synchronous rectifier is operated in a second condition different from the first condition, updating the estimated duration signal by charge sharing between the first and second capacitors;

checking whether the summation of the present duration signal and a predetermined value exceeds the estimated duration signal; and if the summation is less than the estimated duration signal during the discharge time, setting, after the end of the discharge time, the estimated duration signal to be a constant less than the present duration signal.

6. A synchronous rectification controller for controlling a synchronous rectifier with a body diode, the synchronous rectification controller comprising:

a first recorder providing an estimated duration signal;

a second recorder providing a present duration signal corresponding to a discharge time when the body diode is forward biased;

an update circuit for updating the estimated duration signal based on the present duration signal when the body diode is reversely biased, so as to make the estimated duration signal close to the present duration signal; and a switch controller switching the synchronous rectifier based on the estimated duration signal;

wherein the second recorder comprises a current source and a capacitor, the current source charges the capacitor to generate the present duration signal, and the switch controller switches the synchronous rectifier based on a difference between the present duration signal and the estimated duration signal;

wherein the second recorder further comprises a bias resistor connected between the current source and the capacitor, and the switch controller switches the synchronous rectifier by comparing a voltage at a joint node between the bias resistor and the current source with the estimated duration signal.

7. The synchronous rectification controller of claim 6, further comprising a reset switch to reset the present duration signal during an initial time at the beginning of the discharge time.

8. The synchronous rectification controller of claim 6, wherein the update circuit updates the estimated duration signal based on a peak value of the present duration signal.

9. The synchronous rectification controller of claim 6, wherein the estimated duration signal and a peak of the present duration signal are recorded at two capacitors respectively, and the update circuit is capable of connecting the two capacitors to alter the estimated duration signal by charge sharing.

10. A synchronous rectification controller for controlling a synchronous rectifier with a body diode, the synchronous rectification controller comprising:

a first recorder providing an estimated duration signal;

a second recorder providing a present duration signal corresponding to a discharge time when the body diode is forward biased;

an update circuit for updating the estimated duration signal based on the present duration signal when the body diode is reversely biased, so as to make the estimated duration signal close to the present duration signal;

a switch controller switching the synchronous rectifier based on the estimated duration signal; and a protection circuit for setting, after the end of the discharge time, the estimated duration signal to be a constant less than the present duration signal.

11. The synchronous rectification controller of claim 10, wherein the setting is performed after the present duration signal is determined to never exceed the estimated duration signal minus a predetermined value during the discharge time.

12. A timing controller for providing adaptive timings for a synchronous rectifier with a body diode, the timing controller comprising:

a ramp generator for providing a ramp signal at a first capacitor, wherein the ramp signal corresponds to a discharge time when the body diode is forward biased;

a second capacitor for recording an estimated duration signal;

an update circuit connected between the first and second capacitors, for shorting the first and second capacitor to update the estimated duration signal by charge sharing; and a comparator with two inputs coupled to the ramp signal and the estimated duration signal respectively, for comparing the ramp signal and the estimated duration signal to control the synchronous rectifier; and a protection circuit for setting the estimated duration signal to be a constant after the discharge time.

13. The timing controller of claim 12, further comprising a reset switch to reset the ramp signal during an initial time at the beginning of the discharge time.

14. A timing controller for providing adaptive timings for a synchronous rectifier with a body diode, the timing controller comprising:

a ramp generator for providing a ramp signal at a first capacitor, wherein the ramp signal corresponds to a discharge time when the body diode is forward biased;

a second capacitor for recording an estimated duration signal;

an update circuit connected between the first and second capacitors, for shorting the first and second capacitor to update the estimated duration signal by charge sharing; and a comparator with two inputs coupled to the ramp signal and the estimated duration signal respectively, for comparing the ramp signal and the estimated duration signal to control the synchronous rectifier;

wherein the ramp generator comprises a current source, and a bias resistor, the current source charges the first capacitor through the bias resistor to generate the ramp signal, and the two inputs are connected to the second capacitor and a joint node between the bias resistor and the current source.

15. The timing controller of claim 14, wherein the ramp generator further comprises a third capacitor, the current source charges the first and the third capacitors through the bias resistor to generate the ramp signal, and the update circuit disconnects the first capacitor from the third capacitor when updating the estimated duration signal.

* * * * *